Nov. 4, 1941.  M. H. GROVE  2,261,365
RELIEF VALVE
Filed Dec. 19, 1938   2 Sheets-Sheet 1
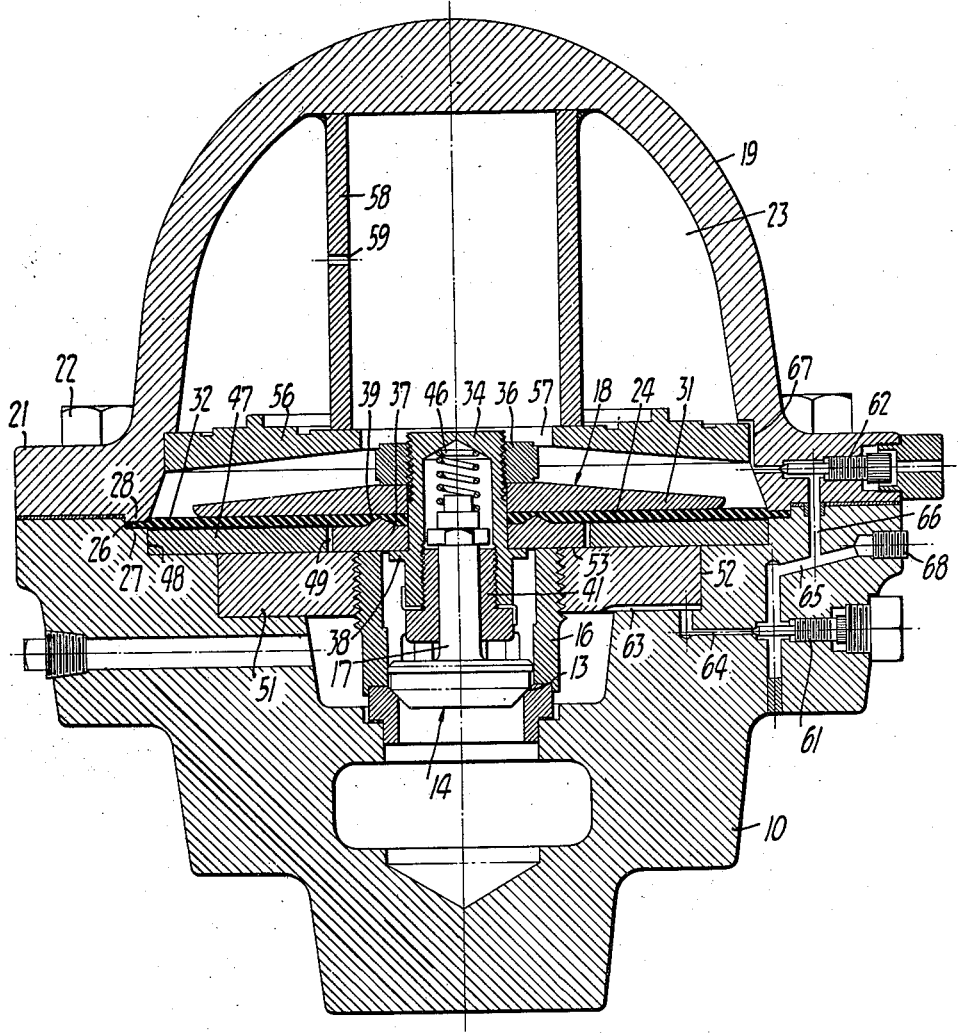
FIG_1
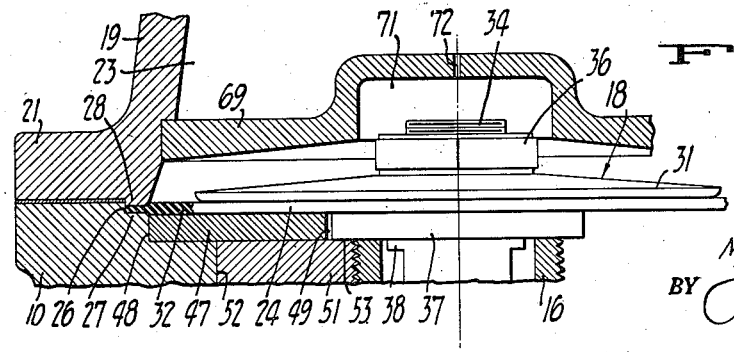
FIG_3
INVENTOR.
Marvin H. Grove
BY Paul D. Flehr
ATTORNEY Nov. 4, 1941.    M. H. GROVE    2,261,365
RELIEF VALVE
Filed Dec. 19, 1938    2 Sheets-Sheet 2
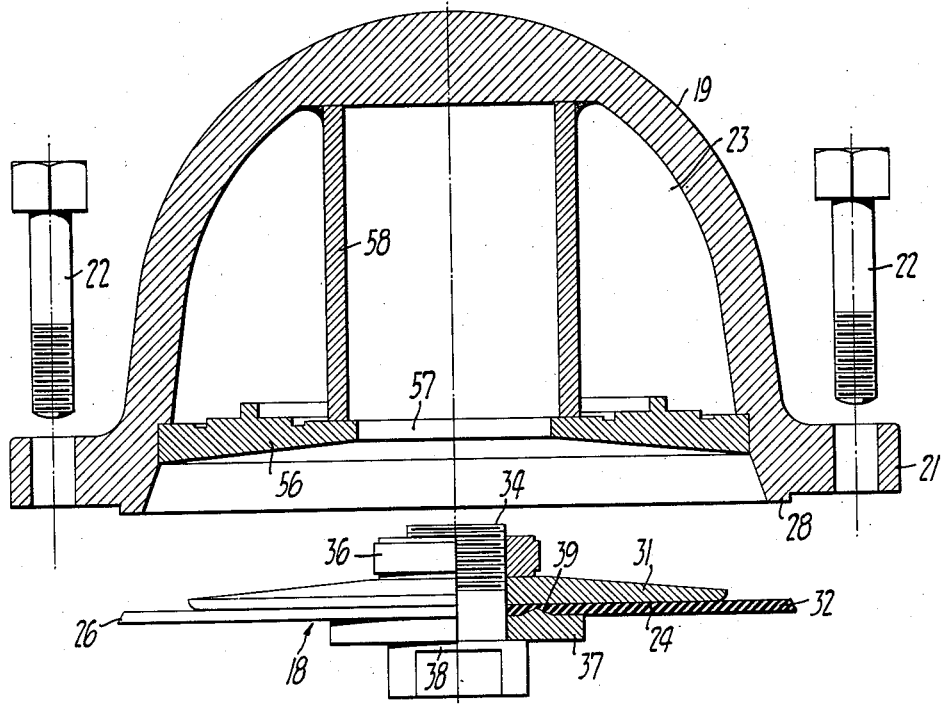
FIG_2_
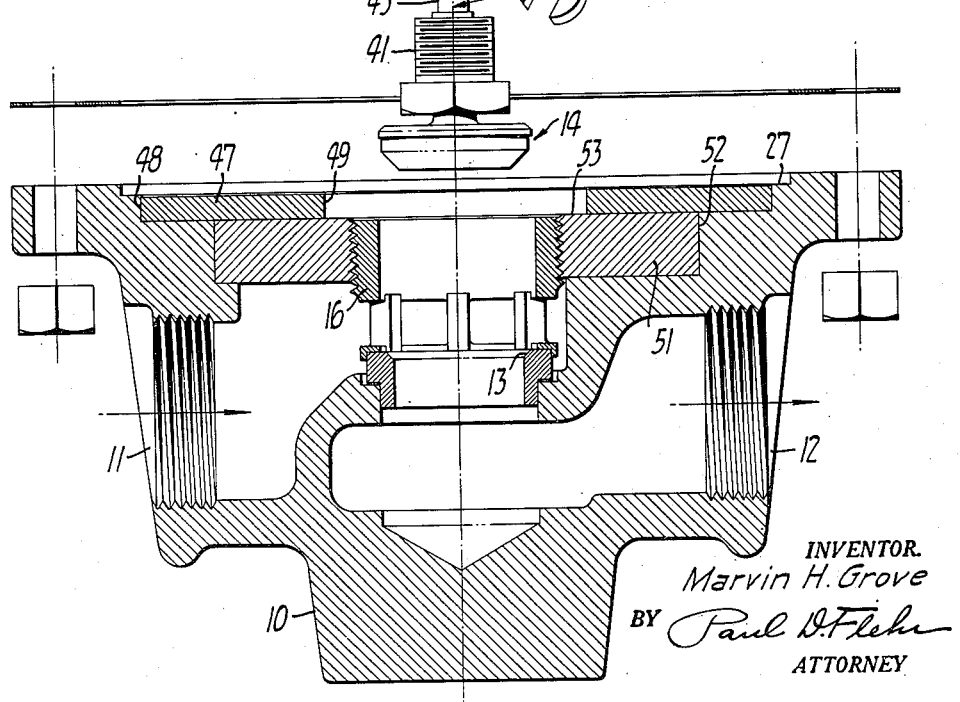
INVENTOR.
Marvin H. Grove
BY
ATTORNEY Patented Nov. 4, 1941

2,261,365

UNITED STATES PATENT OFFICE 2,261,365

RELIEF VALVE

Marvin H. Grove, Berkeley, Calif.

Application December 19, 1938, Serial No. 246,655

5 Claims. (Cl. 137—53)

This invention relates generally to apparatus for controlling the flow of fluids from a relatively high pressure source. It applies particularly to so-called pressure relief or back pressure regulators which are utilized in instances where it is desired to vent fluid from a pressure receiver or like source, when the pressure exceeds a predetermined value.

It is an object of the invention to provide a flow control device of the above character which will be simple in construction and reliable in operation.

A further object is to provide a regulating device of the above character which will avoid chattering or slapping of the valve member upon its cooperating seat, irrespective of the pressures with which the device may be used or the rate with which fluid is vented.

Another object of the invention is to provide a relief valve or regulator which will afford reliable action in relieving pressures at the desired pressure values, and which also afford a relatively accurate and reliable regulating action.

Further objects of the invention will appear from the following description in which the preferred embodiment of the invention has been set forth in detail in conjunction with the accompanying drawings.

Referring to the drawings:

Fig. 1 is a side elevation in cross-section illustrating a back flow regulator incorporating the present invention.

Fig. 2 is an exploded view separately illustrating the parts of the device shown in Fig. 1, and illustrating the manner in which these parts are assembled.

Fig. 3 is a fragmentary sectional view illustrating a modified form of dome plate.

The particular embodiment of the invention illustrated in the drawings consists of a body 10 formed of suitable material such as forged steel, and provided with an inlet and outlet opening 11 and 12. Within this body there is a valve seat 13 and a cooperating valve member 14. The valve seat can be in the form of a ring which is fitted within the body, and which is held in position by means of a ported sleeve 16. Valve stem 17 is secured to the valve member 14, and this stem is operably connected to a fluid operated diaphragm assembly 18.

In place of utilizing springs or weights for loading the diaphragm assembly 18, I make use of gas under pressure. Thus clamped upon the body there is a dome 19, which can be formed of suitable material such as forged steel. The flange 21 of this dome is securely clamped to the body by suitable means, such as bolts or screws 22. The space on the upper side of the diaphragm assembly which is enclosed by the dome 19, forms the trapped gas chamber 23 and the gas pressure in this chamber determines the degree of loading of the diaphragm assembly.

The diaphragm assembly illustrated consists of a diaphragm element 24, formed of suitable flexible material such as resilient synthetic rubber. The peripheral edge portion 26 of this diaphragm element is seated upon an annular ledge 27, formed in the body 10. The dome carries an annular shoulder 28, and when the dome is assembled upon the body the peripheral edge portion 26 of the diaphragm element is tightly squeezed between the shoulders 27 and 28.

The diaphragm assembly also includes the rigid circular diaphragm plate 31. This plate extends over the major area of the diaphragm element 24, leaving only an unsupported annular marginal portion 32.

In order to form a desirable form of mechanical connection between the diaphragm assembly and the valve stem 17, the diaphragm assembly is centrally apertured to receive the plug or sleeve 34. The upper end of this sleeve is externally threaded to receive a clamping nut 36. Surrounding sleeve 34 immediately below diaphragm element 24, there is a relatively heavy circular plate or collar 37. Sleeve 34 carries an annular shoulder 38 which engages the under side of plate 37, thus serving to clamp this plate against the flexible diaphragm element. A suitable gasket can be interposed between shoulder 38 and plate 37, in order to avoid leakage. Also the upper face of plate 37 can be provided with an annular portion 39, in order to more effectively grip and seal against the inner peripheral portion of the diaphragm element 24.

A ferrule 41 is threaded into the lower end of sleeve 34, and an opening in this ferrule serves to loosely accommodate the valve stem 17. That portion of stem 17 extending above the upper end of ferrule 41 is provided with an annular groove 43 to accommodate a slotted retaining washer 44. The upper end of the valve stem is also engaged by compression spring 46, whereby the valve stem and the associated thrust washer 44 are normally urged downwardly with respect to the diaphragm assembly.

A circular filler plate 47 underlies the diaphragm element 24 and is secured to the body as by means of a forced fit within the annular shoulder 48. The upper face of plate 47 is substantially flat, and forms a substantially imperforate wall against which the lower surface of the flexible diaphragm element may press when the pressure below the diaphragm assembly is less than the pressure within the chamber 23. With the proportioning illustrated the upper surface of plate 47 has an area equivalent to a major part of the total area of the diaphragm element 24. The central opening 49 in plate 47 is slightly larger in diameter than the plate 37.

Immediately below the annular plate 47, there is a filler plate or disc 51, which can be somewhat smaller in diameter than the outer diameter of plate 47. The body is recessed to receive disc 51, and in actual manufacture the outer periphery of disc 51 can have a press fit within the annular recess 52, of the body. Disc 51 has a central opening which has a threaded engagement with the upper end of the ported sleeve 16. Note that the diameter of the opening through disc 51 is somewhat smaller than the opening 49 in plate 47. This serves to provide an annular shoulder 53 against which the plate or collar 37 may engage.

The proportioning of the parts just described may vary in different instances, dependent upon the conditions under which the device is to be used. However, for a back pressure relief regulator, intended to be adjusted for relief of pressures varying from 50 to 3500 lbs. per square inch, with an opening in the valve seat varying from ½ to 1½ inches, the effective diameter of the diaphragm 24 can be in the neighborhood of 7¼ inches and the thickness of collar 37 may be about the same as plate 47. More specifically plate 47 can be about ¼ inch in thickness, with its opening 49 having a diamteer of 3 inches. Collar 37 can be about ¼ inch in thickness and its outside diameter can be 2⅜ inches. The lost motion between the valve stem 17 and the diaphragm assembly, that is the distance the diaphragm assembly must move upwardly from its lowermost position before lifting the valve, can be about 3/64 inch. With the foregoing example when the pressure in the chamber 23 exceeds the pressure below the diaphragm assembly, the diaphragm element 24 is in direct physical contact with the entire upper surface of plate 47.

In order to limit upward movement of the diaphragm assembly, and for another purpose to be presently described, an annular dome plate 56 is shown secured within the dome 19, immediately overlying the diaphragm. The central opening 57 in this plate serves to accommodate the nut 36. A tubular member 58 is also provided, with the upper end of this member sealed and secured to the top of the dome, and the lower end seated upon the upper face of plate 56. One wall of member 58 is shown provided with a small flow restricting orifice 59, through which the gas within the dome must pass in surging between the space within member 58, and the space surrounding the same.

In order to facilitate changing the gas pressure within the dome 19, I provide an arrangement of needle valves 61 and 62. By opening both these needle valves, gas from the inlet side of the device can be bled into the dome chamber 23, through the connecting ducts 63, 64, 65, 66 and 67. In order to bleed gas from chamber 23 and thus reduce its pressure, one can open needle valve 62 while valve 61 remains closed, and then loosen the plug 68 to permit escape of gas to the atmosphere.

To explain operation of the device it will be presumed that the inlet 11 is connected to a tank or receiver containing gas under pressure, and that the outlet 12 either connects to the atmosphere or to some other gas receiving system. Also it will be presumed that one desires to vent gas from the receiver when pressure attains a predetermined value, thus in effect limiting the inlet pressure. The device is so adjusted that the pressure in the dome chamber is substantially the pressure at which it is desired to vent gas from the pressure receiver. As long as the inlet pressure is substantially below the pressure in chamber 23, the valve 14 remains closed, and the diaphragm assembly remains in its lowermost position as illustrated in Fig. 1 but with diaphragm element 24 pressed down on plate 47. When the inlet pressure exceeds the pressure in dome 23, this pressure acts upwardly on the lower side of the diaphragm assembly to raise the diaphragm assembly upwardly, lifting the valve 14 from its seat. If the inlet pressure falls below a predetermined value, the diaphragm assembly is moved downwardly because of the pressure in dome chamber 23, to cause the valve member 14 to close upon its seat. While the valve member is open the device in effect functions as a regulator, in controlling flow of gas in such a manner as to tend to maintain the pressure upon the inlet side substantially constant.

To explain the function of plate 56 and orifice 59, it can be pointed out that if the member 58 were omitted entirely, or if orifice 59 were in the form of a relatively large opening, the device would be subject to erratic operation under certain operating conditions. Thus with a back pressure regulator proportioned as described above, should the inlet pressure fall below 50 lbs. while the outlet is discharging into the atmosphere, the valve tends to flutter and chatter upon its seat, instead of affording the smooth operation characteristic of the device for inlet pressures in excess of 50 lbs. With the dome plate 56 and tubular member 58 dividing the space above the diaphragm, together with the flow restricting orifice 59, it is possible to secure smooth operation at inlet pressures well below 50 lbs. per square inch, and with the device discharging directly to the atmosphere. I attribute this result to a damping action by virtue of the small orifice 59, since this orifice imposes an impedance against flow of gas through the same. Thus rapid movements such as characterize a fluttering action of the valve, are inhibited.

With a back pressure regulator proportioned in accordance with the example previously stated, the opening 59 can be of the order of from say ⅛ to 3/16 of an inch in diameter. The tubular member 58 in addition to dividing the space above the diaphragm assembly, also forms a reinforcing strut for the dome plate 56.

There is no tendency for the valve member 14 to pop open too violently, or to shut with a pounding action, which is attributed in part to the plate 47. As the valve 14 approaches its seat, the clearance between the lower surface of diaphragm 32 and the upper face of plate 47, approaches a relatively small value of the order of 3/64 of an inch or less. Gas flowing into or displaced from the space below diaphragm 32, must pass through the orifice afforded between the outer periphery of disc 37 and the inner periphery of plate 47. Thus in effect there is a cushioning action tending to prevent abrupt movements under relatively high inlet pressures, irrespective of the rapidity with which pressure changes may occur.

As previously explained when operating at inlet pressures below 50 lbs. per square inch, smooth operation is afforded by virtue of the division of the space above the diaphragm by plate 56 and tubular member 58, in conjunction with the flow restricting orifice 59. Under conditions of low inlet pressures, particularly with the discharge side being to atmospheric or to a sub-atmospheric pressure, the device will be operating at near full capacity, with the diaphragm 32 disposed a considerable distance above the plate 47.

As previously explained there is a certain amount of lost motion in the connection between the valve stem 17 and the diaphragm assembly. In other words from the position of the parts shown in Fig. 1 the diaphragm assembly must be moved upwardly a slight amount before picking up the valve member 14. Such lost motion is desirable in that it enables more positive closing of the valve member upon its seat, and in addition permits a certain amount of self alignment of the valve member with respect to the seat, due to the fact that stem 17 is relatively loosely fitted within the ferrule 41. In addition to the engagement between the valve stem and ferrule 41 the valve member 14 is generally guided in its movement between open and closed positions, due to the fact that its outer diameter is only slightly less than the internal diameter of the ported sleeve 16. Thus although the valve member is guided with respect to its seat, limited lateral movements of the stem 17 are permitted within the limitations of the clearance between this stem and the ferrule 41 to promote a positive seal between the valve and its associated seat when the diaphragm assembly moves downwardly to its lowermost limit.

Fig. 3 illustrates another construction for the dome plate 56, which serves to greatly reduce the free space directly above the diaphragm assembly. Thus in this case the dome plate 69 is mounted within the dome 19 as previously described, and instead of providing the tubular member 58, the plate extends completely over the diaphragm assembly. A recess 71 in the central portion of the plate accommodates the nut 36 and the upper projecting end of the plug or sleeve 34. A flow restricting orifice 72 is provided at some convenient point in the dome plate, and forms flow restricting communication between the relatively small space above the diaphragm assembly, and the space in the remainder of the dome 19.

The arrangement described with reference to Fig. 3 can be advantageously used for relatively small differential pressures, that is for relatively low inlet pressures where the device is designed to give relatively high flow rates for such small differential values. It would be evident however that such a regulator can also be used for relatively high inlet pressures, the same as the regulator previously described.

This application is a continuation in part of my co-pending application Serial Number 92,707, filed July 27, 1936 which has matured into Patent No. 2,181,428, issued November 28, 1939, and entitled "Flow regulator."

I claim:

1. In a pressure relief valve, a body having inflow and outflow openings, a valve seat formed within the body, a movable valve member cooperating with the valve seat, a fluid pressure operated diaphragm assembly carried within the body above the seat, said assembly including a flexible circularly contoured diaphragm element having its peripheral edge portion gripped between two portions of the body, and also including a rigid circular disc engaging the upper face of the diaphragm and extending over the major area of the same, the diaphragm assembly being capable of vertical movement toward and away from said seat, both the diaphragm and the disc being provided with central aligned apertures, a plug extending through said openings, a nut threaded upon the upper end of the plug, the lower end of the plug being provided with an annular flange which is sealed with respect to the diaphragm element, there being an opening extending axially into the plug through the lower end of the same, a stem secured to the valve member and extending upwardly into said opening in the plug, and means cooperating between the plug and the stem for operably connecting the same together, whereby movements of the diaphragm assembly cause the valve member to move between open and closed positions.

2. In a pressure relief valve, a body having inflow and outflow openings, a valve seat formed within the body, a movable valve member cooperating with the valve seat, a diaphragm assembly carried within the body above the valve seat, said assembly including a flexible circularly contoured diaphragm element having its peripheral edge portion gripped between two portions of the body and also a rigid circular disc engaging the upper face of the diaphragm and extending over the major area of the same, said diaphragm and said disc having central aligned openings through the same, means including a plug extending through said aligned openings, the lower end of the plug having an annular flange which is sealed upon the diaphragm element, a nut threaded upon the upper end of the plug and serving to urge the disc against the diaphragm, there being an opening into the plug from the lower end of the same, a stem secured to the valve member and extending upwardly into said opening in the plug, means serving to confine the total flexing movement of the diaphragm assembly between definite limiting positions, one position corresponding to full open position of the valve member and the other corresponding to closed position of the valve member, means serving to cooperably connect the valve stem with said plug, said means including a pair of shoulders which are slightly out of engagement by an amount constituting only a minor fraction of the total flexing movement of the diaphragm assembly, when the diaphragm assembly is in the limiting position corresponding to closed position of the valve member, said shoulders being in engagement for the major part of the flexing movement of the diaphragm assembly whereby for such movements the diaphragm assembly and valve member move in unison, and spring means serving to normally urge said shoulders together.

3. In a pressure relief means of the character described having a body and valve means within the body for controlling flow of fluid therethrough, the body having a main part with inlet and outlet openings and a dome part adapted to receive a predetermined amount of trapped gas under pressure, a flexible diaphragm element having its peripheral portion clamped between the dome and main body parts, a circular filler member fixed within the body and forming a surface underlying the diaphragm and against which the diaphragm may press, a valve seat ring carried by the main body part, and a ported sleeve removably threaded within the filler member and serving to retain the seat ring within the body, and a valve member cooperating with the seat ring and connected to the diaphragm.

4. In a relief valve of the type adapted to vent fluid from a high pressure source when the pressure from said source increases beyond a predetermined value for which the device is adjusted, a body having an inlet opening for connection to said source and also having an outlet, a valve member disposed within the body and movable in opposite directions between open and closed positions, a flexible diaphragm having its peripheral edge portion sealed with respect to the body, said diaphragm being operably connected to move said valve member, the space on one side of said diaphragm being in communication with the inlet, means forming a gas chamber upon the other side of the diaphragm within which gas under pressure can be maintained to exert loading forces upon the diaphragm, the pressure in said chamber serving to determine the pressure at which the diaphragm flexes to open said valve member, means forming rigid walls serving to divide the interior of said chamber into two compartments with one of said compartments surrounding the other and with one of said compartments in direct communication with a space above said diaphragm, and a flow restricting orifice serving to establish communication between said compartments.

5. In a relief valve of the type adapted to vent fluid from a high pressure source when the pressure from said source increases beyond a predetermined value for which the device is adjusted, a body having an inlet opening for connection to said source and also having an outlet, a valve member within the body and movable in opposite directions between open and closed positions, a flexible diaphragm operably connected to move said valve member, a dome secured to the body and forming a closed gas chamber extending over one side of the diaphragm, the peripheral edge portion of the diaphragm being clamped between annular surfaces formed on the dome and in the body whereby the diaphragm is sealed with respect to both the body and the dome, means including a rigid plate overlying the diaphragm assembly and serving to limit movement of the diaphragm assembly in one direction and to partition the interior of the dome into two compartments with one of said compartments surrounding the other and with one of said compartments in direct communications with a space above said diaphragm, and a flow restricting orifice serving to establish communication between said compartments, the space on the other side of the diaphragm being in communication with the inlet.

MARVIN H. GROVE.